Sept. 9, 1958 P. V. WISDOM 2,851,544

TELEPHONE ATTACHMENT

Filed Jan. 7, 1955

INVENTOR.
POLLARD V. WISDOM
BY
Clark & Ott
ATTORNEYS

United States Patent Office 2,851,544

Patented Sept. 9, 1958

2,851,544

TELEPHONE ATTACHMENT

Pollard V. Wisdom, Great Neck, N. Y.

Application January 7, 1955, Serial No. 480,527

1 Claim. (Cl. 179—188)

This invention relates to telephonic equipment and more particularly to means for excluding undesirable sounds during a telephone conversation.

An object of the invention is to provide an attachment for covering the mouthpiece of a telephone so as to exclude undesirable sounds or conversation in the vicinity of the telephone from being transmitted over the telephone line during the time that the party at the other end of the line is talking.

Another object of the invention is to provide an attachment which is mounted on the mouthpiece of a telephone for movement from open relation to sound excluding relation.

Still another object of the invention is to provide an attachment having a base which is releasably secured to the mouthpiece of a telephone and which is formed with an aperture communicating with the opening in the mouthpiece and adapted to be closed by a cover normally retained in canted or uncovered relation with the base and which may be manually moved to dispose the cover in closed relation with reference to the opening in the mouthpiece.

With the foregoing and other objects in view, reference is now made to the following specification and accompanying drawings in which the preferred embodiment of the invention is illustrated.

Figure 1:
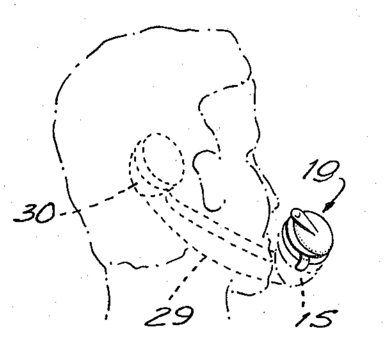
Fig. 1 is a perspective view of a telephone mouthpiece and receiver shown in the usual position of use during a telephone conversation and with an attachment constructed in accordance with the invention applied to the mouthpiece thereof.
Figure 2:
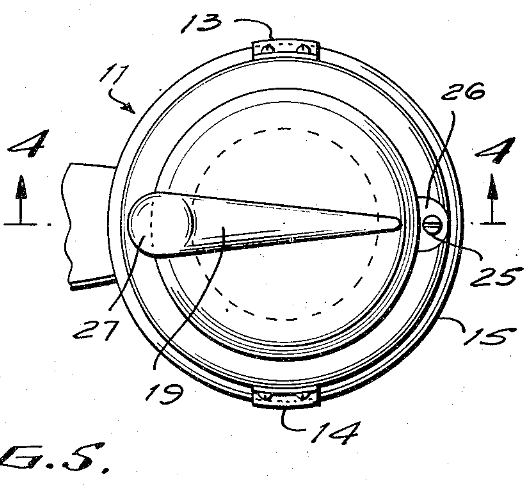
Fig. 2 is a front view of the attachment and showing the arm connecting the mouthpiece with the receiver partially broken away.
Figure 5:
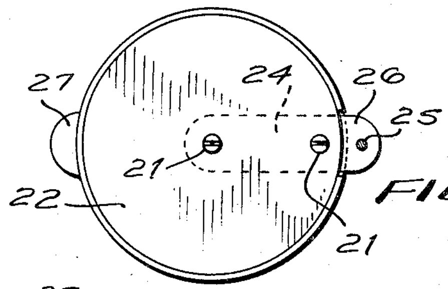
Fig. 5 is an underside view of the cover of the attachment.

Referring to the drawings, the attachment is releasably mounted on the mouthpiece 10 of a telephone to permit of the use of the telephone in the usual manner and which is provided with a cover adapted to be moved to a position for excluding undesirable sounds or conversation in the vicinity of the telephone from being transmitted over the telephone line during the time that the party at the other end of the line is talking.

The attachment includes a base 11 of annular formation having a central opening 12 which registers with the opening in the mouthpiece and is provided with a plurality of spring clips 13 having inturned ends 14 adapted to engage over the outer shell 15 of the mouthpiece for releasably securing the attachment thereon.

The base 11 snugly fits against the outer face of the mouthpiece and for this purpose the base is formed with an annular recess 16 in the underside thereof in which a soft compressible ring 17 of rubber composition or the like is snugly fitted which seats against the outer face of the mouthpiece for preventing sounds from entering the mouthpiece through the joint between the base and the mouthpiece.

Figures 3, 4, 6:
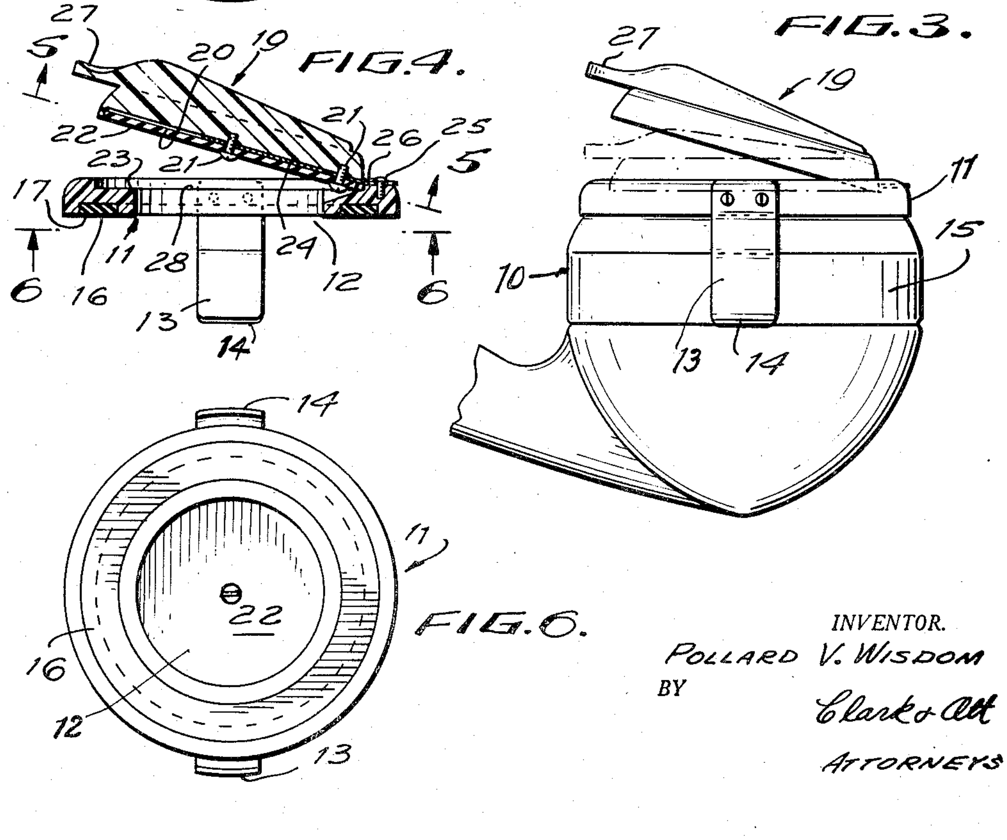
Fig. 3 is a view in elevation of the mouthpiece with the attachment applied thereto.
Fig. 4 is a vertical sectional view through the attachment taken approximately on line 4—4 of Fig. 2.
Fig. 6 is an underside view of the base of the attachment.

The attachment also includes a cover 19 which is formed with a circular recess 20 in the lower face thereof in which is secured by screws 21 a circular rubber disk 22 adapted to snugly seat on the depressed annular face 23 and formed in the upper face of the base. The cover 19 is affixed to the base 11 by a flat metal spring 24 which extends inwardly between the disk 22 and the face of the recess 20 and is affixed to the cover by the screws 21 and to the base by a screw 25. The spring 24 is bent as at 26 adjacent the juncture of the cover and base so as to normally maintain the cover in canted or partially open relation as shown in Figs. 3 and 4 of the drawings and which may be moved to closed relation as desired by manually depressing the cover so as to exclude sounds from entering the mouthpiece. For facilitating the movement of the cover to closed relation, a manipulating extension 27 is provided which is adapted to be conveniently engaged by the thumb of the hand holding the telephone mouthpiece, and when the cover is moved to closed relation the lower portion thereof together with the disk 22 snugly fits the circular depression 28 in the upper face of the cover with the disk 22 contacting the depressed annular face 23 thereof.

The attachment is adapted to be applied to any type of mouthpiece and as illustrated in Fig. 1 of the drawings the same is shown on the mouthpiece 14 forming a part of the holder 29 having a receiver 30 at one end and the mouthpiece 14 at the opposite end.

While the preferred form of the invention has been shown and described herein, it is to be understood that the same is not so limited but shall cover and include any and all modifications thereof which fall within the purview of the invention.

What is claimed is:

In an attachment for the mouthpiece of telephones, a base member having a central opening therethrough and having a depressed annular rim in the upper face thereof surrounding said opening and with an annular recess in the under side thereof surrounding said opening, a soft compressible ring member fitting said recess which seats about its inner peripheral edge against the outer face of the mouthpiece for preventing sounds from entering the mouthpiece through the joint between the base and the mouthpiece, spring clips affixed to said base and adapted to engage over the wall of the mouthpiece for releasably securing the same thereto, a cover, a compressible disk secured to the under side of said cover and adapted to snugly seat on the depressed annular rim in the upper face of said base, a flat spring affixed to said base and to said cover for disposing the cover in normally open relation with the cover arranged at an acute angle with reference to the plane of the base and permitting of the movement thereof into covering relation with said opening in the base.

References Cited in the file of this patent

UNITED STATES PATENTS

| | | |
|---|---|---|
| 950,865 | Plumb | Mar. 1, 1910 |
| 1,398,029 | Lee | Nov. 22, 1921 |

FOREIGN PATENTS

| | | |
|---|---|---|
| 199,076 | Great Britain | June 6, 1923 |